Nov. 10, 1931.　　　D. DREIER　　　1,830,985
POWER WATER WHEEL
Filed Nov. 25, 1930
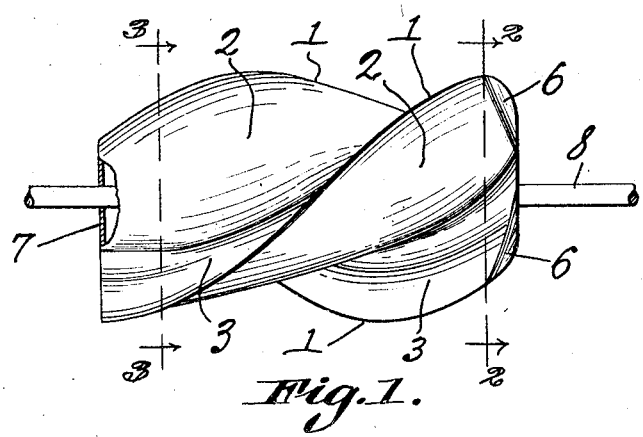
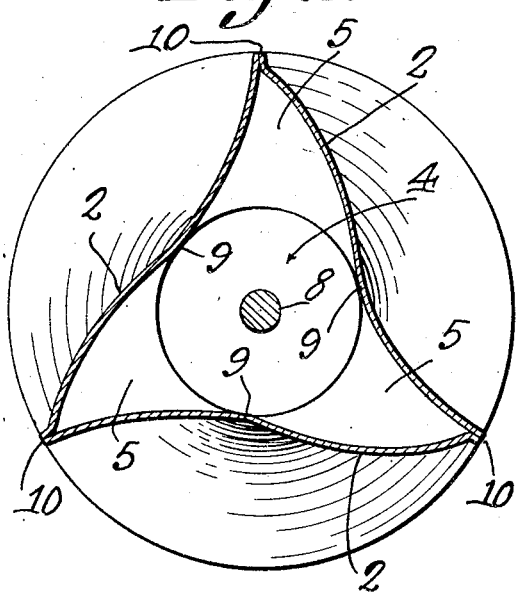
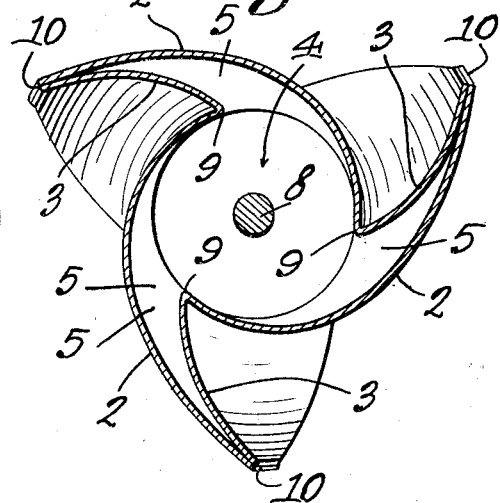
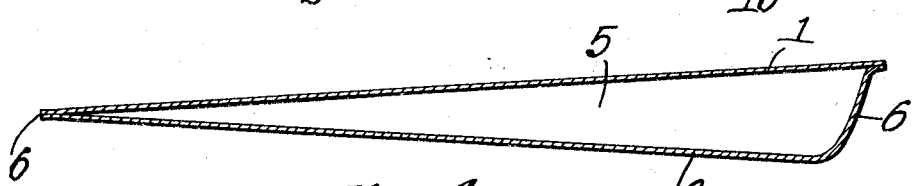
Inventor
Dominick Dreier
By C. A. Snow & Co.
Attorneys.

Patented Nov. 10, 1931

1,830,985

UNITED STATES PATENT OFFICE

DOMINICK DREIER, OF LIVINGSTON, MONTANA, ASSIGNOR OF TWENTY-FIVE PER CENT TO EDWARD E. GRABOW, OF LIVINGSTON, MONTANA

POWER WATER WHEEL

Application filed November 25, 1930. Serial No. 498,156.

This invention aims to provide a water wheel which will float in the water and be capable of being turned by the current, the wheel being of peculiar efficiency and being capable of operating at various angles in the water, it being possible to join together a number of unit water wheels, where an increase in power is desired.

It is within the province of the disclosure to improve generally, and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 shows in elevation, a device constructed in accordance with the invention, parts being broken away;

Figure 2 is a section on the line 2—2 of Figure 1;

Figure 3 is a section on the line 3—3 of Figure 1;

Figure 4 is a longitudinal section of one of the blades.

The wheel forming the subject matter of this application, preferably is made of metal. It comprises any desired number of longitudinal, spirally arranged blades 1, each having a convexed side 2 and a concaved side 3, the axial portion 4 of the wheel being hollow and the blades 1 being hollow and communicating with the axial portion of the wheel to give the wheel buoyancy, so that the wheel can float in the stream. The blades 1 are closed at their ends, as shown at 6, and disk-like heads 7 close the ends of the axial portion of the wheel. The numeral 5 indicates that the blades 1 are hollow as aforesaid.

The water wheel is further characterized by the fact that, as shown in Figure 4, the blades 1 taper from one end to the other in a direction parallel to the axis of rotation of the wheel, the axis of the wheel being represented by a shaft 8 which may be mounted securely in the heads 7.

The water wheel is further characterized by the fact that the convexed side 2 of one blade and the concaved side 3 of an adjoining blade are fashioned in a single sheet of material as shown at 9, the sheets being joined together along the outer edges of the blades 1, as indicated by the numeral 10.

The wheel will support itself in the water, because the wheel is buoyant, and the current of the stream will rotate it, the wheel of course, being restrained for rotation about an axis represented by the shaft 8. In the event an increase of power is desired, any preferred number of water wheels, constructed in accordance with the invention, may be fastened together, end for end, on the shaft 8.

What is claimed is:

A water wheel comprising longitudinal, spirally-arranged blades, each having a convexed side and a concaved side, the axial portion of the wheel being hollow, and the blades being hollow and communicating with the axial portion of the wheel, the convexed side of one blade merging by an easy reversed curve into the concaved side of an adjoining blade adjacent to one end of the wheel, said curve being gradually changed into a pronounced angle at the opposite end of the wheel, to give the blades a longitudinal taper from one end to the other, and to cause the concaved side of one blade to assume, progressively, a pronounced overhang with respect to the convexed side of an adjoining blade, each blade closed at both ends, and the axial portion of the wheel being closed at both ends, to make the wheel buoyant.

In testimony that I claim the foregoing as my own, I have hereto affixed my signature.

DOMINICK DREIER.